INSTRUMENT MOUNTING HOUSING

Filed Jan. 11, 1955

2 Sheets-Sheet 1

INVENTOR.
Ralph K. Shewmon
BY
Craig V. Morton
HIS ATTORNEY

INVENTOR.
Ralph K. Shewmon
BY
Graig V. Morton
HIS ATTORNEY

United States Patent Office 2,828,352

Patented Mar. 25, 1958

2,828,352

INSTRUMENT MOUNTING HOUSING

Ralph K. Shewmon, Centerville, Ohio, assignor to General Motors Corporation, Detroit, Mich., a corporation of Delaware Application January 11, 1955, Serial No. 481,218

2 Claims. (Cl. 174—53)

This invention relates to a housing for receiving and mounting electric switches or contactors.

An object of this invention is to provide a mounting structure for an electric switch or contactor that is constructed and arranged to provide for a complete insulating enclosure for an electric switch and also provide a mounting plate by which the structure can be supported in a suitable opening.

In the mounting of electric switches, it is necessary to enclose the switch to prevent access to the electrical contacts or the terminals of the switch. In this invention this is accomplished by placing a switch within a container that is also provided with a peripherally extending flange that provides a mounting flange for the container.

It is also an object of this invention to provide a switch mounting container that will completely electrically insulate a switch disposed therein which can be mounted in any wall opening or within a conventional electric wall switch box.

It is still another object of the invention to provide a switch mounting structure that comprises a combination wall switch cover plate for a conventional electrical wall switch junction box and an electrical insulating enclosure or container for the switch.

It is another object of the invention to provide a structure in accordance with any of the foregoing objects that is divided into two substantially identical parts along a parting plane midway between opposite sides of the structure with the parting plane extending through the opening provided in the structure through which electric wires extend so that the two part structure can be placed into engagement along the parting plane to totally enclose an electric switch in a manner that it can be mounted either in a standard electrical wall switch junction box or in any exposed opening with the switch within the structure being completely enclosed to prevent exposure of any electrical connections.

Further objects and advantages of the present invention will be apparent from the following description, reference being had to the accompanying drawings wherein a preferred form of the invention is clearly shown.

Figure 4:
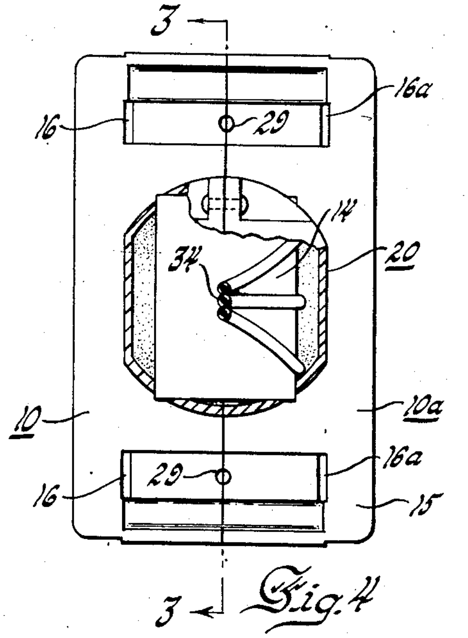
Figure 4 is a cross sectional view taken substantially along line 4—4 of Figure 3.

In this invention the switch housing structure consists of two substantially identical parts 10 and 10*a* which when placed in side by side relationship as illustrated in Figure 4 form a wall switch cover plate 15 and a switch enclosure or container 20 in which a switch or contactor 14 is positioned.

Each of the parts 10 and 10*a* of the switch housing consists of a planarly arranged cover plate 12 that has a container or housing 13 extending from one side only thereof. The container 13 of the housing part 10 forms only one-half of the container, the other half of the container being formed by the housing or container 13*a* extending from one side of the planarly arranged cover plate 12*a*. It will be apparent from Figure 5 that the container parts 13 and 13*a* and cover plate parts 12 and 12*a* are divided into a two part structure along a parting plane that extends normal to the cover plate portion 12. Thus when the two parts 10 and 10*a* of the structure are brought into side by side relationship there is formed a completely closed container or housing in which a switch 14 can be placed to completely enclose the switch and prevent access to any part thereof.

Each of the cover plate portions 12 and 12*a* are provided with slots 16 and 16*a* respectively disposed on opposite sides of the parting plane extending through the structure.

Figure 1:
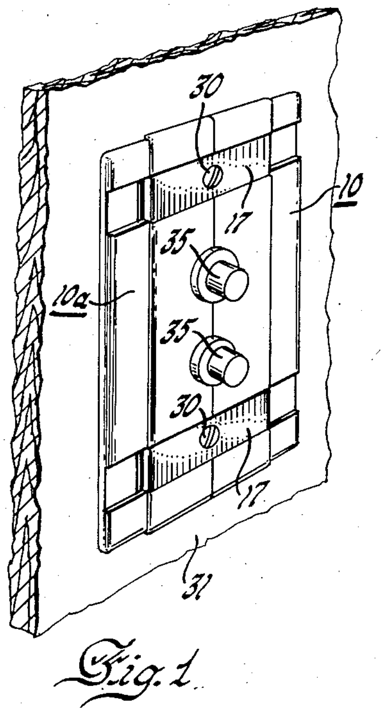
Figure 1 is a perspective elevational view of a switch housing structure incorporating features of this invention illustrated as mounted on a panel.
Figure 5:
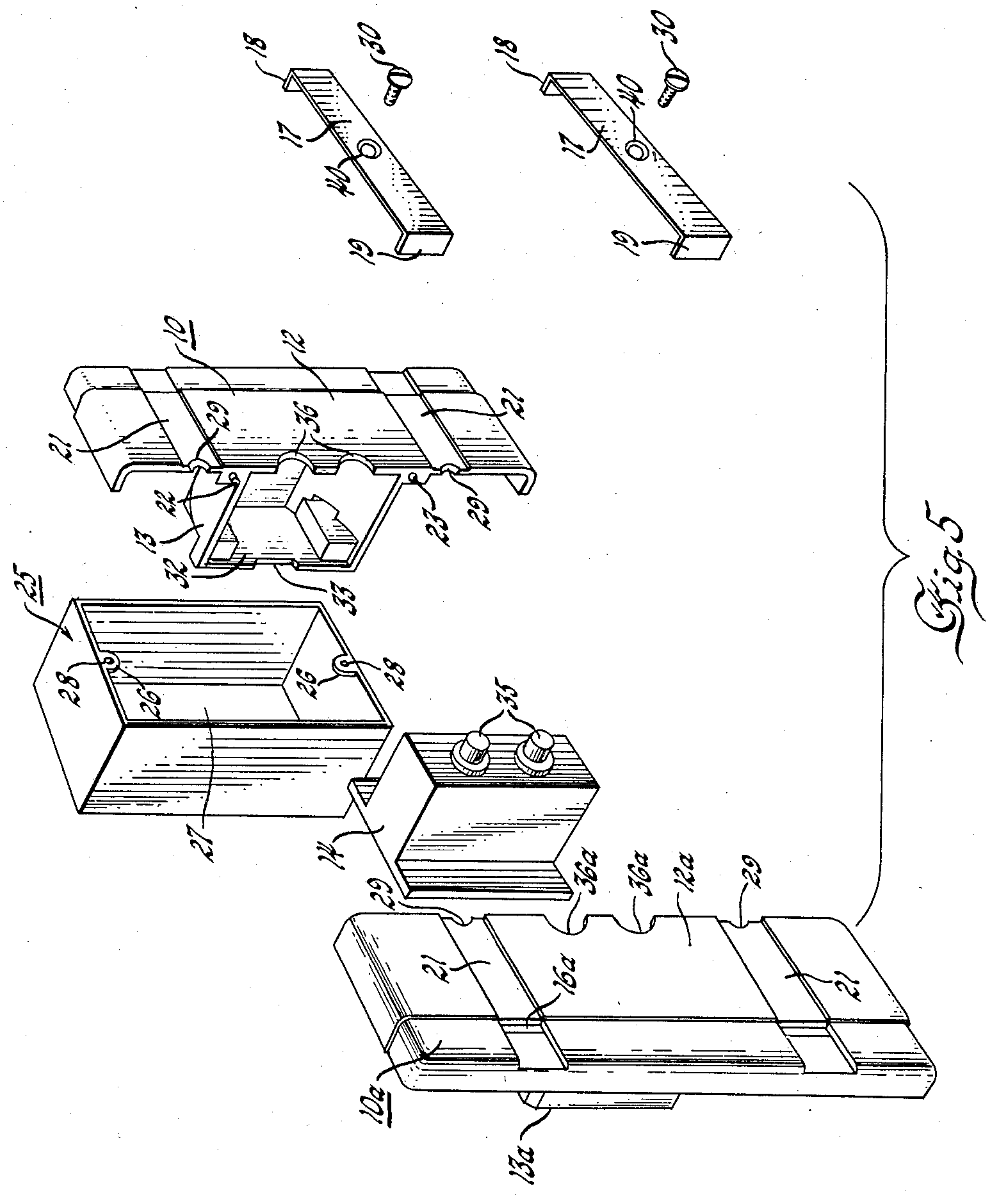
Figure 5 is an exploded perspective view of the switch housing structure together with a switch and wall switch housing to illustrate the manner of their assembly into the wall switch housing.

A fastening strap 17 having the ends 18 and 19 bent normal to the face of the strap, as shown in Fig. 5, is placed in a recess 21 in the face of the cover plate 12 and 12*a* with the ends 18 and 19 projecting into the slots 16 and 16*a*, the fastening strap 17 bridging the parting line or parting plane between the two structure parts 12 and 12*a*, as shown in Figure 1. When the ends 18 and 19 of the strap 17 are inserted through the openings 16 and 16*a*, the ends are bent angular to the plane of the cover plate 12 and 12*a* to retain the two parts 12 and 12*a* in side by side relationship in engagement along the parting plane.

To provide for planar alignment of the parts 12 and 12*a* pins 22 extend from the parts 12 and 12*a* into correspondingly positioned openings 23 in the respective parts.

Figure 2:
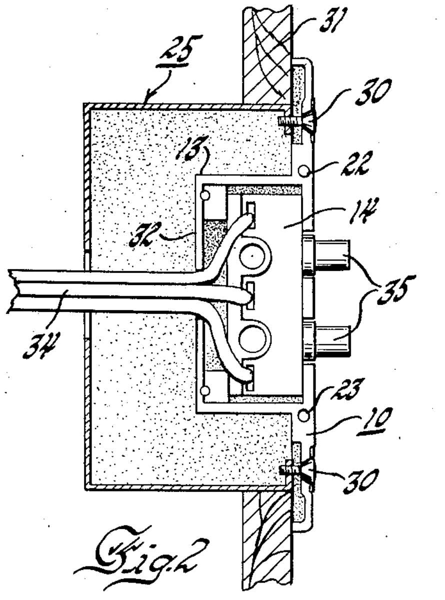
Figure 2 is a cross sectional view of a switch housing structure illustrating the manner of its mounting in a conventional electric wall switch housing.

The cover plate 12—12*a* extends from the container 13—13*a* as a flanged portion around the periphery of the container. It is therefore adapted to provide a cover plate for a wall switch mounting housing 25 that is of the conventional type having fixture mounting lugs 26 on opposite sides of the open face side 27 of the wall switch housing. The fixture mounting lugs 26 each have a threaded opening 28 to receive a mounting screw by which the plate 12—12*a* is supported on the wall switch housing 25. The parting plane of the switch housing structure 10—10*a* passes through openings 29 provided in the plate 12—12*a* through which mounting screws 30 extend and also through openings 40 in the strap 17 for mounting of the structure in an opening of a panel 31, as illustrated in Figure 1 or to the wall switch housing 25, as illustrated in Figure 2.

The wall 32 of the container 13—13*a* has an opening 33 through which the electric wires 34 pass from the switch 14 positioned within the container 13—13*a*. The axis of the opening 33 is in the parting plane between the parts 10 and 10*a*.

The plate parts 12—12*a* have opening portions 36 and 36*a* adapted to receive a projecting part 35 of the switch 14 by which the switch 14 can be operated from the exterior of the housing structure 10—10*a*. These opening portions 36—36*a* have their axis on the parting plane of the two parts 10—10*a*.

Figure 3:
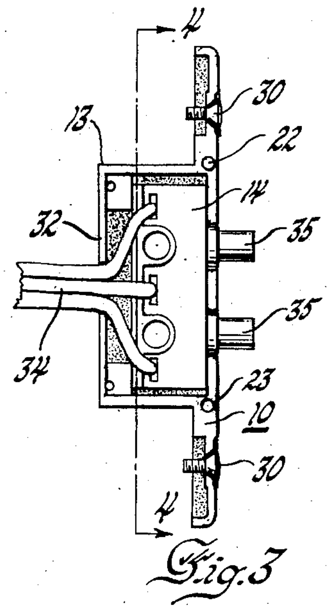
Figure 3 is a cross sectional view of the switch housing structure of this invention taken along line 3—3 of Figure 4.

From the foregoing description it will be obvious that the two parts 10—10*a* can be brought together in a side by side relationship to enclose the switch 14, as shown in Figures 3 and 4 with the electric lines 34 passing through the opening 33 and the projections 35 on the switch 14 extending through the opening portions **36—36*a***, as shown in Figure 3.

The openings 29 in the cover plate **12—12*a* are coaxial with the threaded openings 28 in the fixture mounting lugs 26 of a standard wall switch housing 25 so that the switch mounting structure 10—10*a* can be supported directly in a standard wall switch box, as shown in Figure 2, or it can be mounted on a wood panel 31, as illustrated in Fig. 1. In either instance the mounting structure 10—10*a* totally encloses the switch 14** to prevent any possibility of contact with the electric terminals of the switch.

It will of course be understood that the housing parts 10 and **10*a*** are made of electrical insulating material so that they are not conductive.

While the form of embodiment of the invention as herein disclosed constitutes a preferred form, it is to be understood that other forms might be adopted as may come within the scope of the claims which follow.

What is claimed is as follows:

1. An electrical junction box cover plate and integral switch housing for receiving a switch assembly, comprising, a planarly arranged plate adapted to provide a cover plate for an opening, a closed hollow container integral with said plate and projecting from one side only thereof and having a rear wall spaced from said plate and adapted to receive a switch assembly, said container being positioned substantially centrally of said plate, said plate forming a front wall of said container and having opening means therein through which a part of a switch is adapted to project to provide for actuation of the switch disposed within the container, said plate having other opening means therein at opposite sides of the first mentioned opening means to receive mounting screws, additional opening means in said rear wall of said container through which electric wires are adapted to extend from a switch positioned within the container, said plate and integral container being divided into two parts on a parting plane extending through the axes of all of said opening means, and a fastening strap on said plate bridging the parting line of the plate with opposite ends of the fastening strap disposed on opposite sides of the parting line and secured to said plate on opposite sides of the parting line to retain said two parts together in engagement along the parting line, said strap having an opening therein aligned with said other opening means to receive the mounting screws disposed in the said other opening means.

2. An electrical junction box cover plate and integral switch housing for receiving a switch assembly, comprising, a planarly arranged plate adapted to provide a cover plate for an opening, a closed hollow container integral with said plate and projecting from one side only thereof and having a rear wall spaced from said plate and adapted to receive a switch assembly, said container being positioned substantially centrally of said plate, said plate forming a front wall of said container and having opening means therein through which a part of a switch is adapted to project to provide for actuation of the switch disposed within the container, said plate having other opening means therein at opposite sides of the first mentioned opening means to receive mounting screws, additional opening means in said rear wall of said container through which electric wires are adapted to extend from a switch positioned within the container, said plate and integral container being divided into two parts on a parting plane extending through the axes of all of said opening means, said plate having slot openings on opposite sides of the said parting line, and a fastening strap on said plate bridging the parting line of the plate with opposite ends of the fastening strap extending into said slot openings to retain said strap on said plate and retain said two parts together in engagement along the parting line, said strap having an opening therein aligned with said other opening means in said plate to receive the mounting screws disposed in the said other opening means.

References Cited in the file of this patent

UNITED STATES PATENTS

| | | |
|---|---|---|
| 1,866,407 | Guett | July 5, 1932 |
| 2,437,802 | Adler | Mar. 16, 1948 |
| 2,466,418 | Gunther | Apr. 5, 1949 |